United States Patent [19]

Dease

[11] Patent Number: 5,049,729
[45] Date of Patent: Sep. 17, 1991

[54] CODED KEY SYSTEM USING PULSE POLARITY

[75] Inventor: Ian J. Dease, Swinton, Great Britain

[73] Assignee: Rigby Electronics Group PLC, Manchester, England

[21] Appl. No.: 520,971

[22] Filed: May 8, 1990

Related U.S. Application Data

[63] Continuation of Ser. No. 118,844, Nov. 9, 1987, abandoned.

[30] Foreign Application Priority Data

Nov. 8, 1986 [GB] United Kingdom ............... 8626719

[51] Int. Cl.⁵ .......................................... G06K 5/00
[52] U.S. Cl. ................................. 235/382; 235/449; 340/825.31; 340/825.59
[58] Field of Search ............................. 235/382, 449; 340/825.31, 825.59

[56] References Cited

U.S. PATENT DOCUMENTS

| | | | |
|---|---|---|---|
| 4,007,355 | 2/1977 | Moreno | 235/441 X |
| 4,345,146 | 8/1982 | Story et al. | 235/449 X |
| 4,471,218 | 9/1984 | Culp | 235/472 |
| 4,625,100 | 11/1986 | Smith | 235/454 X |
| 4,650,981 | 3/1987 | Soletta | 235/492 X |
| 4,661,691 | 4/1987 | Halpern | 235/492 X |
| 4,797,543 | 1/1989 | Watanabe | 235/492 |

Primary Examiner—David Trafton
Attorney, Agent, or Firm—Salter & Michaelson

[57] ABSTRACT

A contactless coded key system, comprising a key 2 and key terminal each housing circuitry enabling information to be transferred from terminal to key, and vice versa, and enabling the key to be powered from the terminal. This circuitry also comprises a light emitting diode and phototransister by means of which the presence of a key in the terminal is sensed. In a fuel monitoring application for a vehicle fleet, for example, each driver has a key enabling him to draw fuel from one or more depots each including a terminal. Fuel dispensed can be logged and fuel economy calculated.

16 Claims, 4 Drawing Sheets

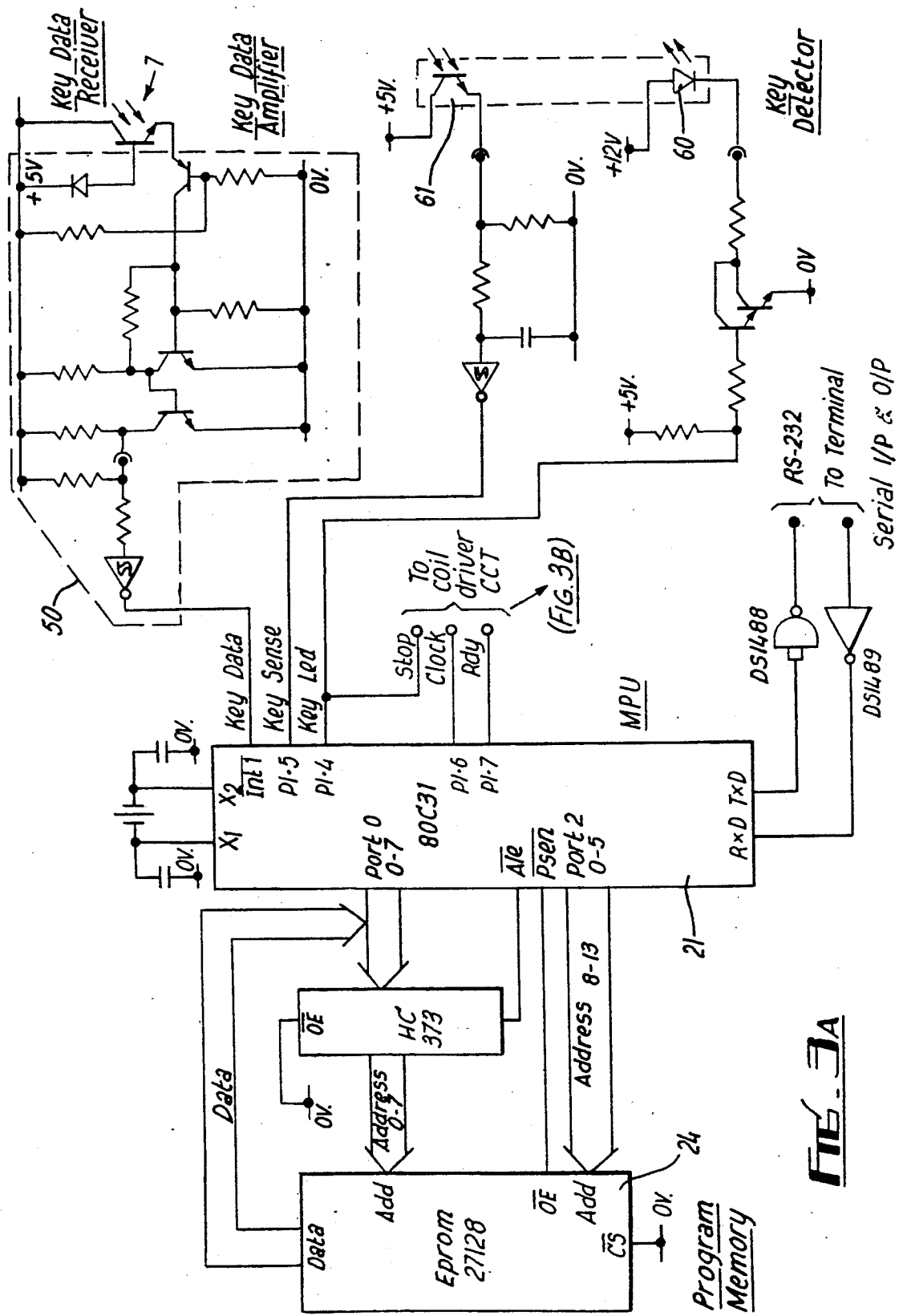
FIG_3A

CODED KEY SYSTEM USING PULSE POLARITY

This is a continuation of application Ser. No. 118,844 filed Nob. 9,1987, now abandoned.

The present invention relates to a coded key system.

One known such system, comprises a plurality of moulded synthetic plastics material keys and a terminal. Each key has a number of projections arranged in a predetermined pattern. When inserted into a keyhole in the terminal and turned those projections displace contacts on the terminal to make or break specific circuits. If the key is valid, this will permit the terminal to activate an authorised transaction such as, for example, the dispensing of a quantity of fuel. Although this system works reasonably well, it has certain disadvantages. The key itself is crude, which is advantageous from the point of view of cheapness, but disadvantageous in that it is not particularly difficult to reproduce it (the key coding is visible) and provides only for a limited number of combination. This means that in a vehicle fleet, for example, where each key will identify a particular driver and/or vehicle only a limited number of vehicles/drivers can be catered for. The contacts in the terminal are exposed and therefore subject to corrosion. Wear through constant use is also a problem. Both lead to increased maintenance costs, terminal down time and general operational inconvenience. For instance, in the example above, a faulty terminal can lead not only to terminal downtime, but also to the loss of vehicle time.

According to one aspect of the invention, there is provided a key for a contactless coded key system comprising a key housing, a circuit disposed in the housing having a memory which may be read from and/or written to, means enabling the memory to be read from and/or written to, means enabling the circuit to be powered from externally of the key and means enabling information to be transmitted to and/or from the key from and/or to another part of the system.

According to another aspect of the invention, there is provided a key terminal for a contactless coded key system comprising means for accepting a key introduced to the terminal, means for transmitting information to and/or receiving information from the key and means for transmitting power to the key to power the key.

According to another aspect of the present invention, there is provided a contactless coded key system comprising a key and a key terminal each having a housing and circuitry disposed in the housing, the housing of the terminal being adapted to accept the housing of the key, in which the circuitry in the key housing has a memory which may be read from and/or written to by the circuitry in the terminal, means enabling the memory in the key to be read from and/or written to the circuitry in the terminal, means enabling the circuit to be powered from the terminal, and means enabling information to be transmitted to and/or from the key from and/or to the terminal and in which the circuitry in the terminal has means for transmitting information and/or receiving information from the key, means for transmitting power to the key to power the key and means to display information received from and/or transmitted to the key.

In an advantageous embodiment of the invention, both the key and the terminal are moulded from synthetic plastics material. The memory of the key comprises an electrically erasable programmable read only memory. The means enabling the memory to be read from and/or written to comprises an interface circuit. The means enabling the circuitry to be powered from externally of the key comprises a winding forming part of a transformer. The means enabling information to be transmitted to and/or from the key comprises the above mentioned winding and an optical or electrical device. The optical device may comprise an LED (light emitting diode) disposed in the key, preferably at one end thereof. The means for accepting the key in the terminal comprises a keyhole and the means for transmitting information comprises another winding of the transformer mentioned above. This winding also fulfills the function of transmitting power to the key. The terminal comprises means to display information, for example, a light emitting diode, gas discharge, vacuum fluorescent or liquid crystal. This may display information identifying a particular key and also information being written to the key, relating for example to the particular transaction which the key has enabled.

In order that the invention may be more clearly understood, one embodiment thereof will now be described, by way of example, with reference to the accompanying drawings, in which.

Figure 1:
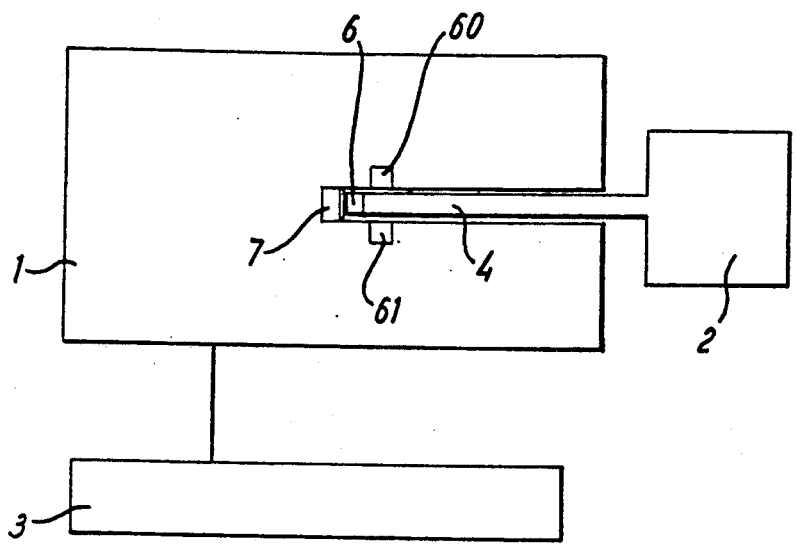
FIG. 1 is a diagrammatic view of a contactless coded key system.
Figure 4:
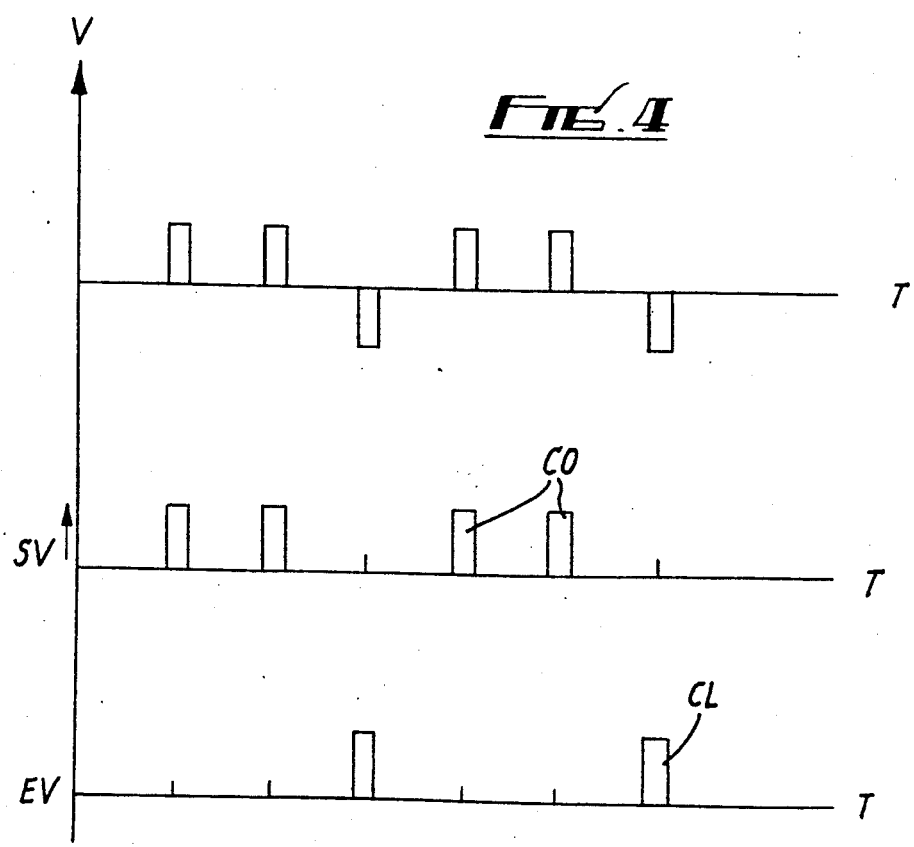
Figure 3B:
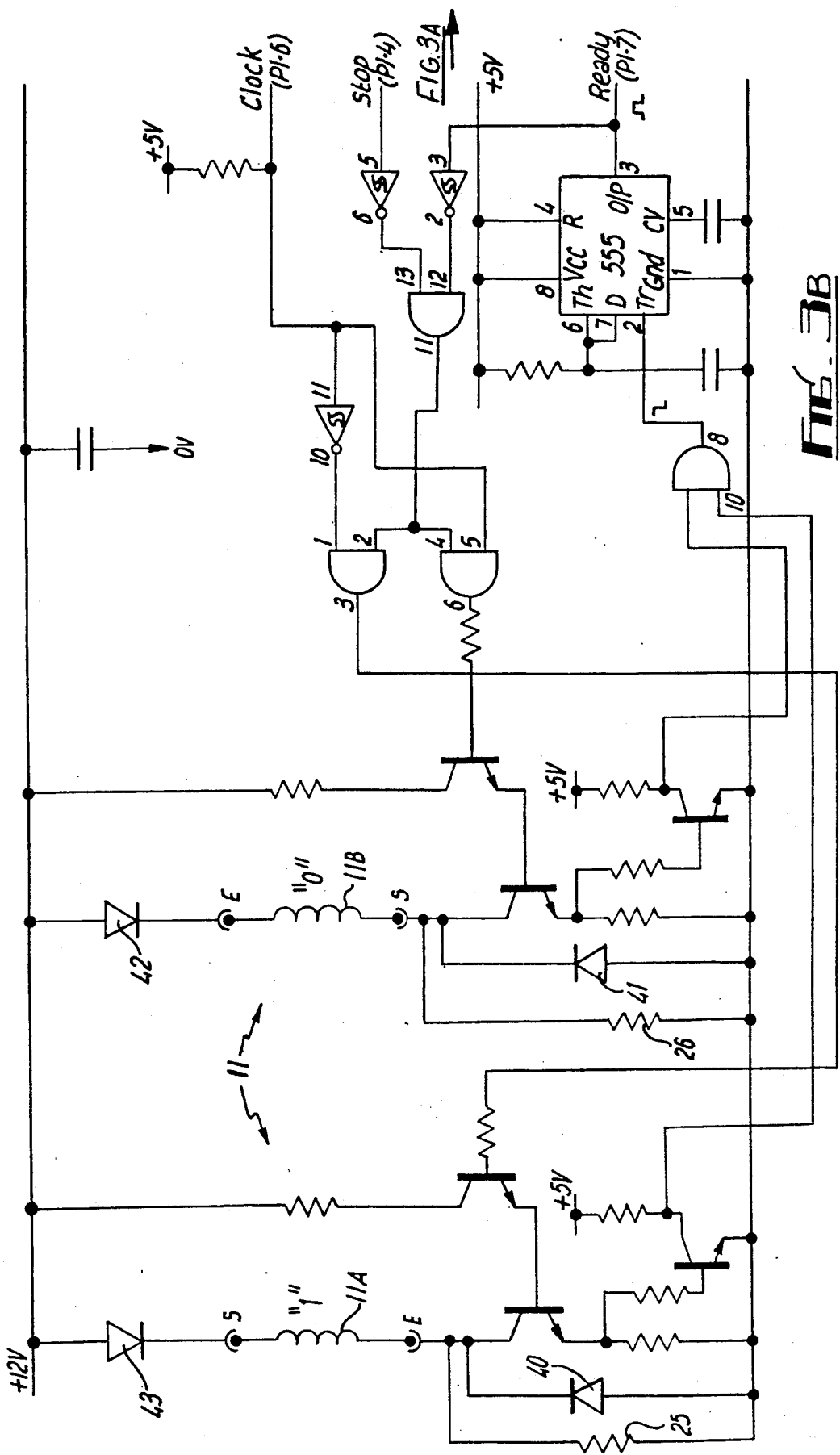

FIGS. 3A and 3B together show a circuit diagram of a key terminal for the system of FIG. 1, and FIG. 4 illustrates pulse trains produced by the circuit of FIG. 5.

Referring to FIG. 1, the contactless coded key system basically comprises a terminal 1 and a key 2. The terminal 1 incorporates a display 3, which, for example, is a liquid crystal display.

Figure 2:
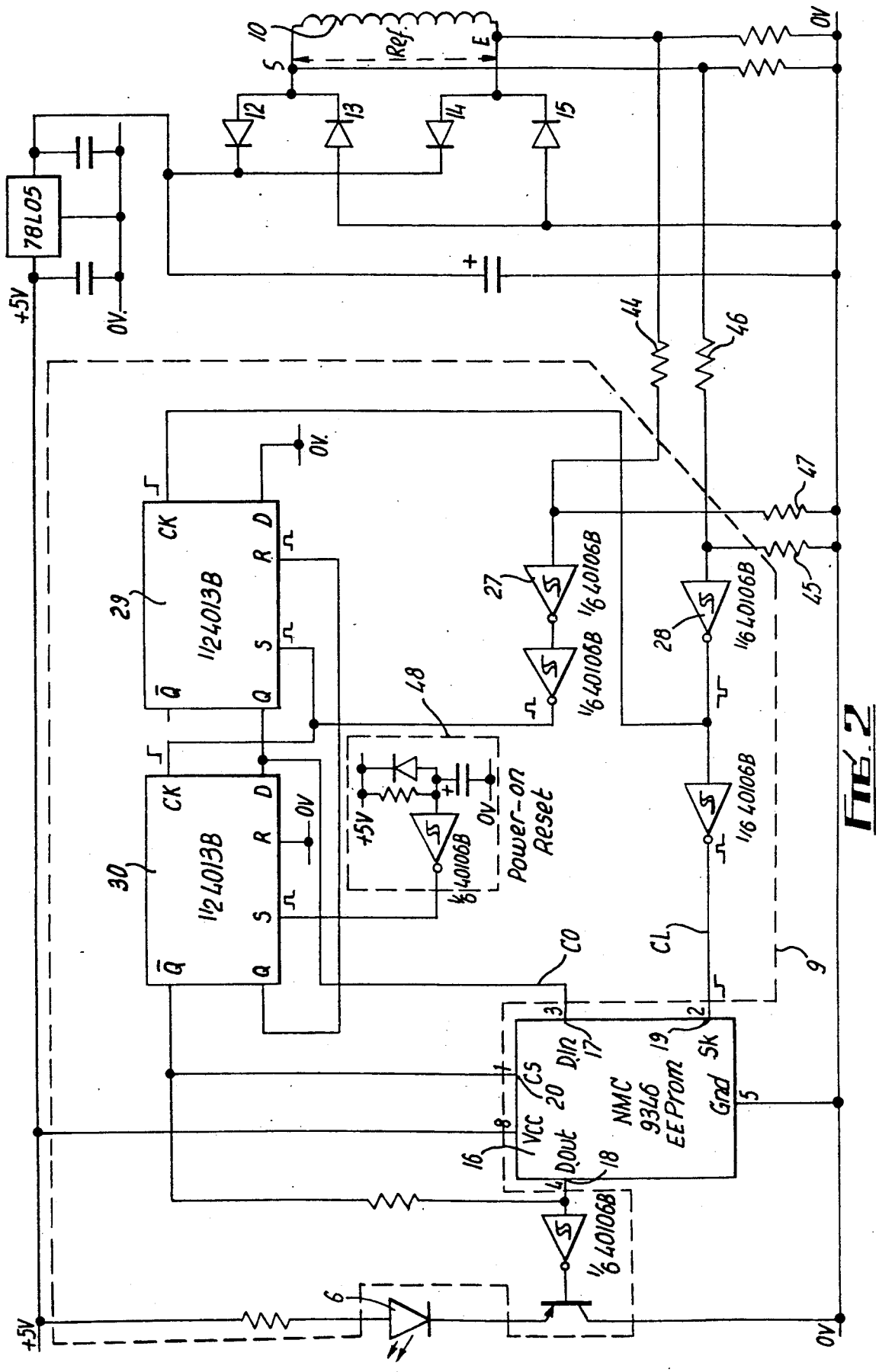
FIG. 2 is a circuit diagram of a coded key for the system of FIG. 1.

Referring to FIGS. 2 and 3, the key is powered from the terminal in the following manner. The key 2 incorporates the secondary winding 10 of a loose coupled transformer in which the primary winding 11 comprising sub-windings 11A and 11B is in the key terminal. Thus, when a key 2 is inserted into the terminal 1, the secondary which is embedded in the key shaft 4, is placed inside the field of the primary in the terminal 1. When the primary 11 is energised, a voltage is induced in the secondary 10 which is rectified, smoothed, and regulated to provide five volts to power the key by means of a full wave bridge rectifier comprising four diodes 12 to 15. The insertion of the key in the terminal is optically detected by means of an optical transmitter in the form of an LED 60 and an optical receiver in the form of a phototransistor 61. The key signals its presence by breaking the beam between transmitter and receiver.

The key incorporates a memory comprising an EEPROM 16 (electrically erasable programmable read only memory). The EEPROM sequences all data moves through two pins 17, 18 (data-in and data-out), controlled by a clock signal on another pin 19. The device is activated by the chip select pin 20. All data into and out of the device is conducted through two pins only. This facilitates reduction of interface circuitry which in turn leads to reduction in size and complexity. The data-in, clock and chip select signals are all supplied from the winding 10 in the key shaft 4. The winding 11 in the terminal that drives the key 2 is controlled by a microprocessor 21. This microprocessor 21 decides on which sub-winding to drive according to the commands and data to be sent to the key 2 under the control of instructions contained in a program memory chip 24 in conjunction with information received usually from equipment to be controlled from the terminal.

The two sub-windings 11A and 11B are disposed on the same former and are arranged so that they are driven out of phase with each other by the circuitry of FIG. 3B. The mechanism to drive the sub-windings is to allow the primary to charge up to a defined level from a low voltage supply by monitoring the current in the primary in use. When the required charge has been reached, the charge current is switched off very quickly resulting in a rapid decay of the field around the primary 11 cutting the secondary winding 10 in the key, and inducing a voltage in it. The actual rate of collapse of the field around the key is controlled by damping resistors 25 and 26 connected to respective sub-windings 11A and 11B of the primary winding 11. This reduces the maximum generated voltage to an acceptable figure, and lengthens the discharge pulse. Great care is taken to reduce series and parallel capacitance in the terminal coil driving circuit to a minimum, thus minimising ringing. Fast switching diodes 40 to 43 are use to ensure that the sub-winding that is not in use has no current flowing in it. These design points, combined, result in a well defined pulse with fast edges being induced in the key secondary winding 10.

The key circuit diagram (FIG. 2) shows the key secondary winding 10 connected to the full wave bridge receiver 12 to 15 which ensures that the power supply is maintained for either polarity pulse in the secondary. The bridge rectifier also acts as a pulse separator, such that pulses of opposite polarity appear as positive going pulses at respective opposite ends of the secondary. The secondary ends are loaded to the key 0 volt rail, and potential dividers comprising pairs of resistors 44 and 45 and 46 and 47 reduce the amplitude of the pulses so that Schmitt trigger buffers 27 and 28 can be used to condition the signals. The result of this is that driving a sub-winding of the primary 11 will result in a pulse train only from the corresponding Schmitt buffer in the key. The pulse trains are named clock CL and control CO, and are illustrated in FIG. 4 (clock pulses are referenced CL and control pulses CO).

The clock pulses CL are applied directly to the EEPROM 16 clock input 19, each rising edge sequencing a data bit in or out when the device is active. (There is no effect when it is inactive). The control pulses are applied to a circuit comprising two 'D' type flip-flops 29 and 30 and these in turn drive the EEPROM 16 data-in and chip select pins 17 and 20. The power-on reset circuit 48 ensures that the flip-flops 29 and 30 are in a known state (EEPROM deselected) when power is applied. To select the EEPROM 16, a single control pulse is applied to the key 2. This sets flip-flop 29 and resets flip-flop 30, causing data-in and chip-select to go high. A clock pulse must follow a control pulse, and this will clock a logic 1 into the EEPROM 16 (all EEPROM cycles begin with a logic 1). The trailing edge of the clock pulse, that is the edge that is not significant to the EEPROM 16, clocks flip-flop 29, causing data-in to go to the logic 0 state. After the EEPROM 16 has been selected, the sequence "control pulse-clock pulse" will cause a single logic 1 to be clocked into the EEPROM, whilst a clock pulse on its own will cause a single logic 0 to be clocked in. The EEPROM is de-selected by issuing two control pulses together, returning the key to the "just powered" state. In this state, clock pulses have no effect on the key, therefore, the key can be left powered without causing any damage.

The EEPROM has a simple instruction set allowing reading, writing, and erasing etc., to be performed. All of these instructions can be executed through the primary and secondary windings of the transformers. The only extra requirement is a means of transferring data from the key to the terminal and is preferably done optically but may be done electrically. An infra-red LED 6 is embedded in the end of the key shaft 3. This is driven directly by the EEPROM 16 so that when data-out 18 is high, the LED is on, and vice-versa. An optical sensor 7 in the terminal receives the data and passes it to the controlling microprocessor 21 in the terminal. An amplifier 50 is provided for the sensor 7.

The above described system has the following advantages. Both key and terminal may be totally sealed with no electrical contacts. A large storage capacity is provided for by the EEPROM which is a long life nonvolatile memory which does not require battery power. The system is programmable after manufacture. It has a small size, low cost and is mass producable.

In use, for example, to monitor fuel usage in a vehicle fleet, each vehicle driven is provided with a key. The key may identify the driver and/or the vehicle. If valid, the key, on insertion into and checking by the terminal, will enable the terminal to activate fuel dispensing means. The amount of fuel dispensed can then be automatically logged against that particular driver and/or vehicle. Other information can be recorded as desired such as the time of delivery. The amount of fuel dispensed can be read to the key so that the key carries that information with it. This can facilitate the calculation of miles per gallon being achieved by that particular vehicle.

It will be appreciated that the above embodiment has been described by way of example only and that many variations are possible without departing from the invention. The key system has application in any circumstances in which access is to be restricted to goods, information or location.

I claim:

1. A key for contactless coded key system comprising a key housing, a circuit disposed in the housing having a memory which may be read from and/or written to, means enabling the memory to be read from and/or written to, means comprising a winding forming part of a transformer for enabling the circuit to be powered from externally of the key and means also comprising the said transformer winding for enabling information to be transmitted to and/or from the key from and/or to another part of the system, and rectifier means connected to the winding such that both positive and negative pulses appearing on the winding are rectified to provide power for the circuit and such that positive and negative pulses can be distinguished form each other to provide operational information to the key, said positive pulses defining a set of positive pulses, said negative pulses defining a set of negative pulses, the pulses of one of said sets of pulses being employed as clock pulses to clock data into the key and the pulses of the other one of said sets of pulses being used to provide the data so clocked.

2. A key terminal for a contactless coded key system comprising means for accepting a key introduced to the terminal, means comprising a winding forming part of a transformer for transmitting information to and/or receiving information from the key and means also comprising the said transformer winding for transmitting power to the key to power the key, and a microprocessor connected to the transformer winding for controlling the transmission of information by both positive and negative pulses via the winding to the key, said positive pulses defining a set of positive pulses, said negative pulses defining a set of negative pulses, the pulses of one of said sets of pulses being employed as clock pulses to clock data into the key and the pulses of the other one of said sets of pulses being used to provide the data so clocked.

3. A contactless coded key system comprising a key and a key terminal each having a housing and circuitry disposed in the housing, the housing of the terminal being adapted to accept the housing of the key, in which the circuitry in the key housing has a memory which may be read from and/or written to be the circuitry in the terminal, means enabling the memory in the key to be read from and/or written to by the circuit in the terminal, means comprising a winding forming part of a transformer for enabling the circuitry in the key housing to be powered from the terminal, and means also comprising the said transformer winding enabling information to be transmitted to and/or from the key from and/or to the terminal and rectifier means connected to the winding such that both positive and negative pulses appearing on the winding are rectified to provide power for the circuit and such that positive and negative pulses can be distinguished from each other to provide operational information to the key, said positive pulses defining a set of positive pulses, said negative pulses defining a set of negative pulses, the pulses of one of said sets of pulses being employed as clock pulses to clock data into the key and the pulses of the other one of said sets of pulses being used to provide the data so clocked, and in which the circuitry in the terminal has means for transmitting information to and/or receiving information from the key, means for transmitting power to the key to power the key and means to display information received from and/or transmitted to the key and a microprocessor connected to the transformer winding for controlling the transmission of information via the winding to the key.

4. A key as claimed in claim 1, which is moulded from synthetic plastics material.

5. A terminal as claimed in claim 2, which is moulded from synthetic plastics material.

6. A key as claimed in claim 1, in which the memory comprises an electrically erasable programmable read only memory.

7. A key as claimed in claim 6, in which the means enabling the memory to be read from and/or written to comprises an interface circuit.

8. A key as claimed in claim 1, in which the means enabling information to be transmitted to and/or from the key comprises the winding and a signal producing device.

9. A key as claimed in claim 8, in which the signal producing device is optical.

10. A key as claimed in claim 8, in which the signal producing device is electrical.

11. A key as claimed in claim 9, in which the optical device is a light emitting diode.

12. A key as claimed in claim 9, in which the optical device is disposed in one end thereof.

13. A key terminal as claimed in claim 2, in which the terminal comprises means to display information.

14. A key terminal as claimed in claim 2, comprising means to sense the presence of a key.

15. A key terminal as claimed in claim 14, in which the means to sense the presence of a key comprises an optical transmitter and an optical receiver so arranged that an inserted key is interposed between transmitter and receiver.

16. A key terminal as claimed in claim 15, in which the optical transmitter is a light emitting diode and the optical receiver is a phototransistor.

* * * * *